United States Patent [19]
Simpson et al.

[11] Patent Number: 5,927,625
[45] Date of Patent: Jul. 27, 1999

[54] HAY CUTTING MACHINE

[75] Inventors: Bret A. Simpson; Paul Wyatt, both of Ellensburg, Wash.

[73] Assignee: Nicholson Manufacturing Co., Seattle, Wash.

[21] Appl. No.: 08/970,167

[22] Filed: Nov. 12, 1997

[51] Int. Cl.[6] ................................................ B02C 18/00
[52] U.S. Cl. ........................... 241/84; 241/95; 241/281; 241/291; 241/605
[58] Field of Search .......................... 241/84, 84.3, 280, 241/281, 605, 169, 291, 95

[56] References Cited

U.S. PATENT DOCUMENTS

| | | | |
|---|---|---|---|
| 684,240 | 10/1901 | Hiles | 241/95 |
| 2,318,142 | 5/1943 | Cox et al. | 241/84.4 |
| 2,581,501 | 1/1952 | Shaver | 241/95 X |
| 2,898,052 | 8/1959 | Kautz | 241/84 |
| 3,105,643 | 10/1963 | Todd | 241/95 |
| 3,933,315 | 1/1976 | Popeil | 241/166 |
| 4,903,902 | 2/1990 | Hufnagel | 241/84 |
| 5,303,472 | 4/1994 | Mbanugo | 241/95 X |

*Primary Examiner*—John M. Husar
*Attorney, Agent, or Firm*—Christensen O'Connor Johnson & Kindness PLLC

[57] ABSTRACT

An apparatus for cutting hay, straw, or other agricultural materials is provided with an intake hopper which directs a supply of material to be cut into a holding chamber. The material in the holding chamber is separated from the material remaining in the intake hopper by a pair of separating blades, while an advancement plate pushes the material in the holding chamber toward a cutting grid. A sliding panel is pulled behind the advancement plate to prevent the material remaining in the intake hopper from falling behind the advancement plate. The material in the holding chamber is cut into shorter lengths as it is pressed through horizontal and vertical slicing blades of the cutting grid.

8 Claims, 5 Drawing Sheets

HAY CUTTING MACHINE

FIELD OF THE INVENTION

This invention relates generally to an apparatus for cutting hay, straw, or other material.

BACKGROUND OF THE INVENTION

Hay, straw, and other agricultural products are commonly used as forage for feeding livestock and other animals. Since shorter fibers of hay are easier for cattle and other animals to eat and digest than longer strands, it is desirable to process hay, either in loose form or packaged in bales, prior to feeding. In prior art hammer mill devices, such as one described in U.S. Pat. No. 5,314,126 to Alvarez, hay is dropped into a circular chamber, in which a number of "hammers," or flat-edged blades, are attached to and evenly-spaced about a rapidly spinning axle. The spinning axle causes the hammer blades to smash into the strands of hay, breaking them into smaller sections.

Since the hammer blades must spin very rapidly in order to break the material into smaller pieces, there is little control over uniformity in the sizes of the resultant pieces, and the process is inefficient due to the large amount of energy that must be expended to spin the hammer blades to suitable speeds. Additionally, since flat-edged blades are used, the area where the material is struck is essentially pulverized rather than cut, as would be the case with a sharpened blade. This pulverizing action, in conjunction with the rapidly spinning hammer blades, creates and stirs up a large amount of dust. In addition to creating possible Occupational Safety and Health violations, the dust represents wasted material that would otherwise be fed to animals.

In consideration of the limitations and disadvantages of the devices and methods currently in use, it should be apparent that an effective solution to the problem of cutting material such as hay is needed. Accordingly, the present invention was developed, and provides significant advantages over previous devices or methods to contain compressed materials.

SUMMARY OF THE INVENTION

In accordance with this invention, an apparatus for cutting hay and other agricultural products is provided. In the preferred embodiment of the invention, material is dropped into an intake hopper and down into a holding chamber. A material advance mechanism separates the material in the holding chamber from any material remaining in the intake hopper, while simultaneously advancing the material in the holding chamber toward a cutting grid, where the material is cut into smaller pieces. To prevent the material remaining in the intake hopper from falling into the material advance mechanism, a sliding panel, or false bottom, is provided to physically separate and close off the opening between the intake hopper and the holding chamber.

Further advantages will be appreciated as the present invention is examined more fully below in the Detailed Description of the Preferred Embodiments.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
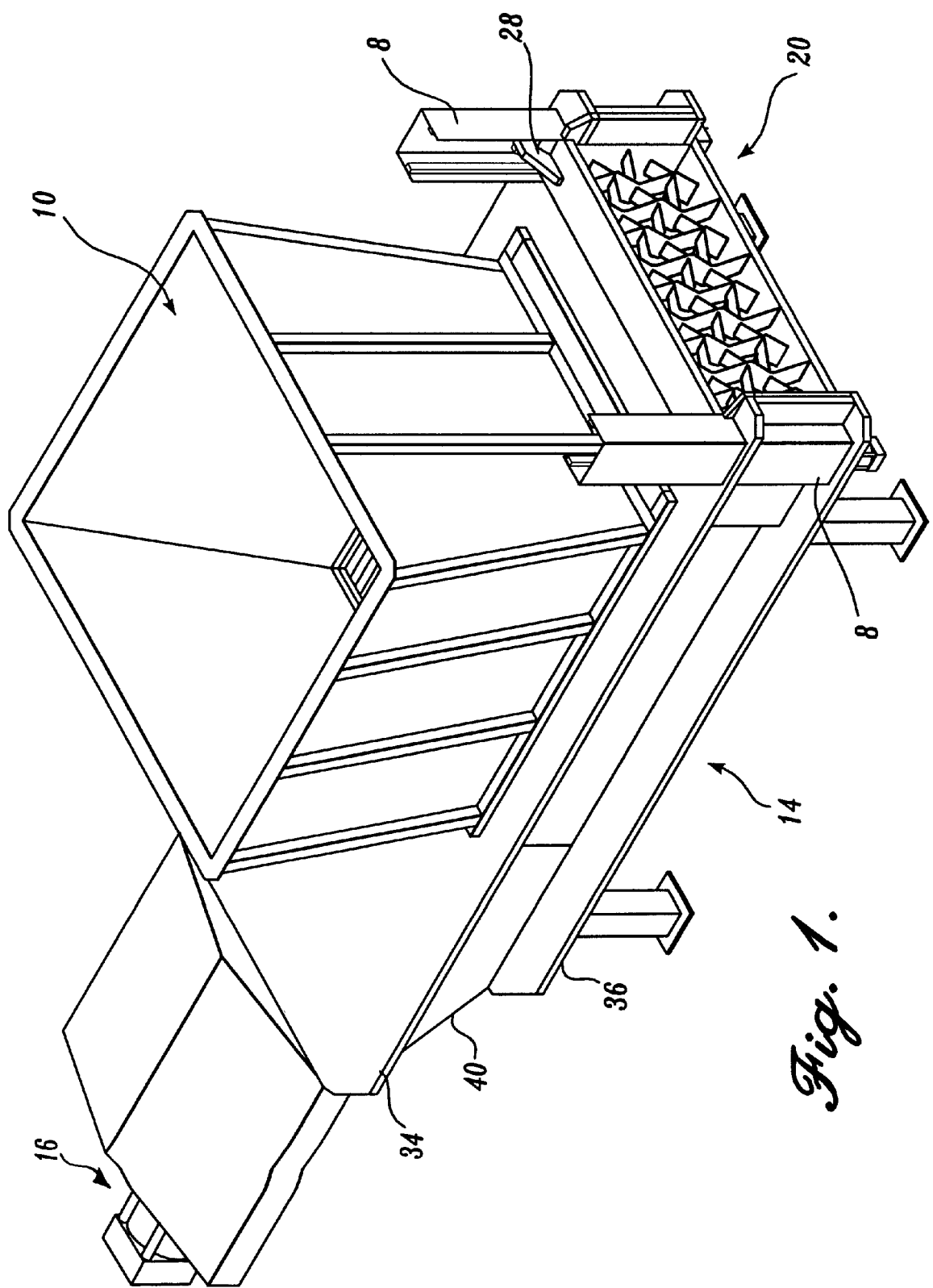
FIG. 1 is a perspective view of an embodiment of the present invention.

A preferred embodiment of the present invention is illustrated in FIGS. 1–5. Referring to FIG. 1, the apparatus includes a housing 14, which preferably, comprises a plurality of walls forming a rectangular tube having a top panel 34, a bottom panel 36, and two side walls 40. The top panel 34 and bottom panel 36 sections both have identical cutouts at their front ends configured to receive two channel guides 8, one at either side of the housing 14. The rears of these cutouts are flat edges running perpendicular to the side walls 40, and aligned with the front edges of the side walls 40 such that a forward, vertical, opening is defined by the edges of the two side walls 40 and the rears of the cutouts in the top panel 34 and bottom panel 36.

In the top panel 34, near, but not at the front end, is a horizontal rectangular opening into the housing 14, beneath which is a holding chamber 12. The opening and holding chamber preferably have a minimum length dimension of 152.4 centimeters (60 inches), and a minimum width dimension of 139.7 centimeters (55 inches) in order to accommodate most bales of hay or other material. An intake hopper 10 is attached to the housing 14 on the top panel 34. The intake hopper 10 includes front and rear walls which are generally trapezoidal in shape, and extend perpendicularly from the top panel 34, with the wider base on top, and two rectangular side walls slanting upward and outward from the top panel 34. The intake hopper 10 has a rectangular lower opening having the same dimensions as the opening in the top panel 14, and is attached to housing 14 such that the lower opening of intake hopper 10 is aligned with opening in the top panel 34.

The holding chamber 12 is situated within the housing 14, directly beneath the opening between intake hopper 10 and top panel 34, and has a forward, vertical, opening beneath the front wall of the intake hopper 10. Situated between the holding chamber 12 and the forward opening of the housing 14 is an expansion area 4. The expansion area 4 is configured such that it has a cross-sectional area that is larger than that of the holding chamber 12.

Figure 5:
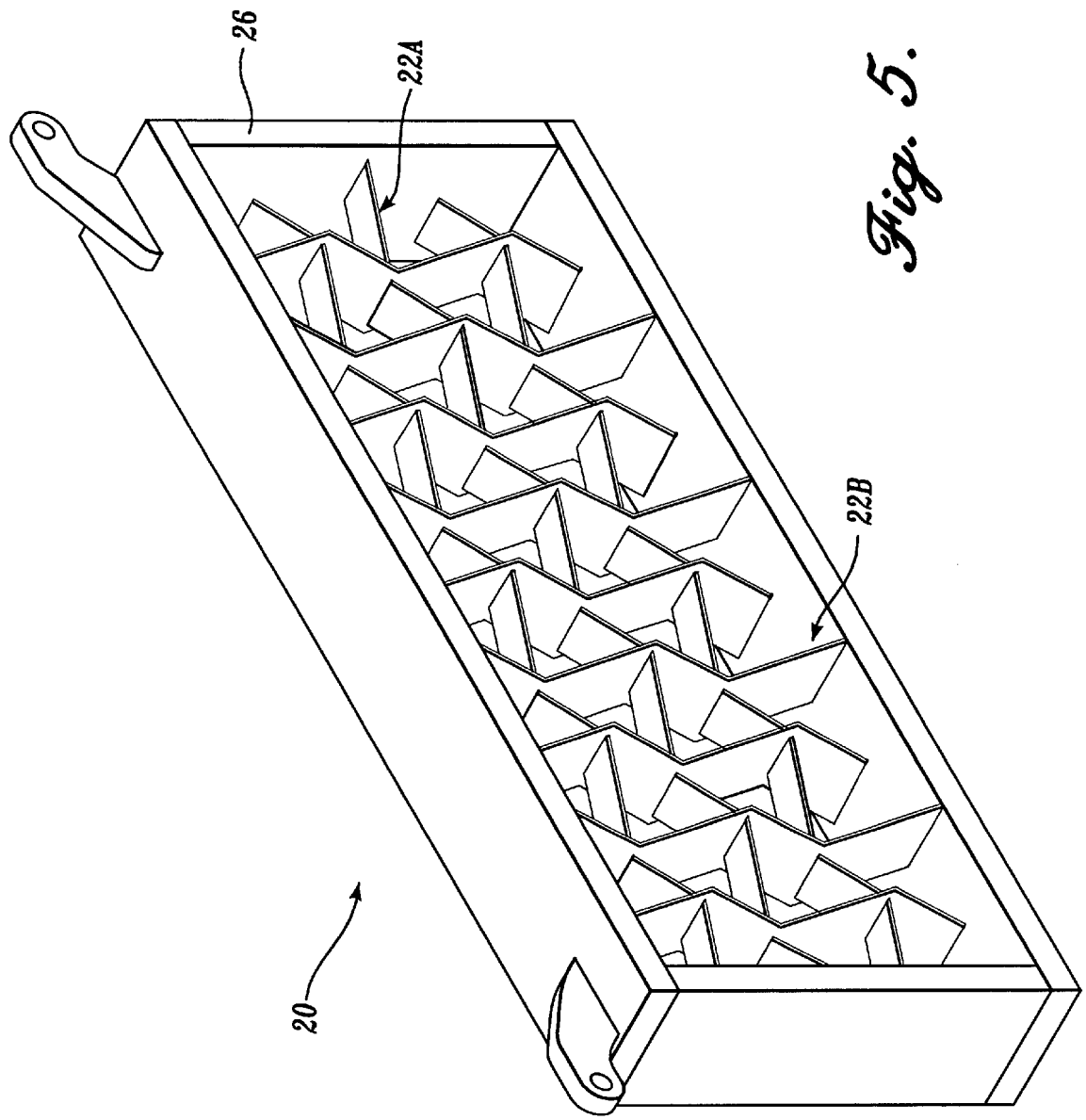
FIG. 5 is a perspective view of a cutting grid according to the present invention.

Removably attached across the front opening of housing 14, is a cutting grid 20 according to the present invention. Referring to FIG. 5, cutting grid 20 includes a rectangular frame 26, having generally greater length and width dimensions than the front opening of housing 14 in order to allow for expansion of material. Within the frame 26 are attached at least one horizontal slicing blade 22a and one vertical slicing blade 22b, secured to the sides of frame 26. The number of horizontal and vertical slicing blades depends on the size of the resulting pieces desired; however, in the preferred embodiment, at least two horizontal slicing blades 22a are used. Those skilled in the art will appreciate that the rigid frame is used in the present invention to secure the ends of the slicing blades to prevent their movement, and will recognize that any other means of securing the ends, such as slots in the housing 14 for receiving the blade ends, may be employed without departing from the spirit of the invention.

The horizontal 22a and vertical 22b slicing blades have the same configuration, except that they may be of differing lengths, and may be flat, single or double-edged blades, but are preferably configured as double-edged blades having a zigzag shape. More specifically, the cutting edges on either side of a slicing blade comprise a number of edge segments forming peaks and valleys along the length of the blade. Where the edge segments form a peak on one side of slicing blade, they form a corresponding valley on the other side. A double-edged design for the slicing blades is preferred for doubling the useful life of the cutting grid 20. When the cutting edges on one side of the cutting grid 20 wear out, the cutting grid may simply be remounted facing the other direction, thereby presenting a new set of cutting edges to the material being cut. The zigzag shape of slicing blades is beneficial in that less pressure must be exerted to cut material than would be required if flat blades were used, thus providing for a more energy efficient process. Additionally, the cost of the system is reduced because a smaller power source is required.

The slicing blades are preferably formed from sheets of metal, either by cutting or stamping, but may also be formed by casting or forging. Any suitable metal, or other rigid material, may be used. Since the slicing blades are preferably formed to present a thin profile to the material to be cut, they are susceptible to bending or other deformation from the high pressures that may be exerted. To prevent these deformations, the horizontal and vertical blades are preferably configured and mounted such that the peaks and valleys of the horizontal blades intersect the vertical blades at corresponding peaks and valleys. Thus, each peak, which would be most susceptible part of a slicing blade to deforming, is prevented from bending to either side by two lateral supports.

With this configuration, it is readily apparent that the number of vertical slicing blades 22b is dependent of the length, or more particularly, the number of peaks, of the horizontal slicing blades 22a, and conversely, the number of horizontal slicing blades 22a is dependent upon the length of the vertical slicing blades 22b. For instance, if a horizontal slicing blade 22a has five peaks, as depicted in FIG. 5, then five vertical slicing blades 22b are required.

In the most common application, where more than one horizontal and/or vertical blade is used, such as is depicted in FIG. 5, then each successive blade of a given orientation will be mounted reversed from its neighbor. For instance, where one vertical blade has a peak, the corresponding locations on the vertical blades on either side will have valleys. The double-edged design of the slicing blades thus provides a further benefit of only having to create two configurations of slicing blade: one horizontal and the other vertical.

Returning to FIG. 1, one or two channel guides 8 are provided for facilitating attachment of the cutting grid 20 to the apparatus. The channel guides 8 have generally squared "U" shaped cross-sections with the tops of the channel guides 8 left open, and the bottoms being closed. The channel guides 8 are attached to the left and right sides of the housing 14 in matching "U" shaped portions of the cutouts in the top 34 and bottom 36 panels, such that the guides 8 extend vertically from the bottom panel 36, traversing the height of the sides 40, and extending above the top panel 34, with the cross-sectional openings, or tops of the "U," of the channel guides 8 facing one another.

Positioning of cutting grid 20 is accomplished by inserting the removable cutting grid 20 between the channel guides 8, and sliding the cutting grid 20 down along the length of channel guides 8 until the cutting grid 20 reaches the sealed channel bottoms. The channel guides 8 and cutouts in the top 34 and bottom 36 panels may be configured such that the cutting grid 20 fits snugly between the channel guides 8, or, as in the preferred embodiment, such that gaps exist between the ends of the cutting grid 20 and the backs of the channel guides 8, or bottoms of the "U." In such an embodiment, channel guides 8 are equipped with connecting tabs (not shown), which may simply be tongue-shaped sections cut in the backs of the channel guides and then bent inward. The connecting tabs have holes punched therein to receive a bolt or other fastener. As shown most clearly in FIG. 5, the top of cutting grid 20 is equipped with two connection tabs 28, one to either side, for securing cutting grid 20 to the corresponding connection tabs in the channel guides 8. This arrangement permits the cutting grid 20 to be attached to the channel guides 8 by securing the connection tabs 28 of the cutting grid 20 to the mating connection tabs of the channel guides 8 through the use of bolts, locks, or other fasteners.

Figure 2:
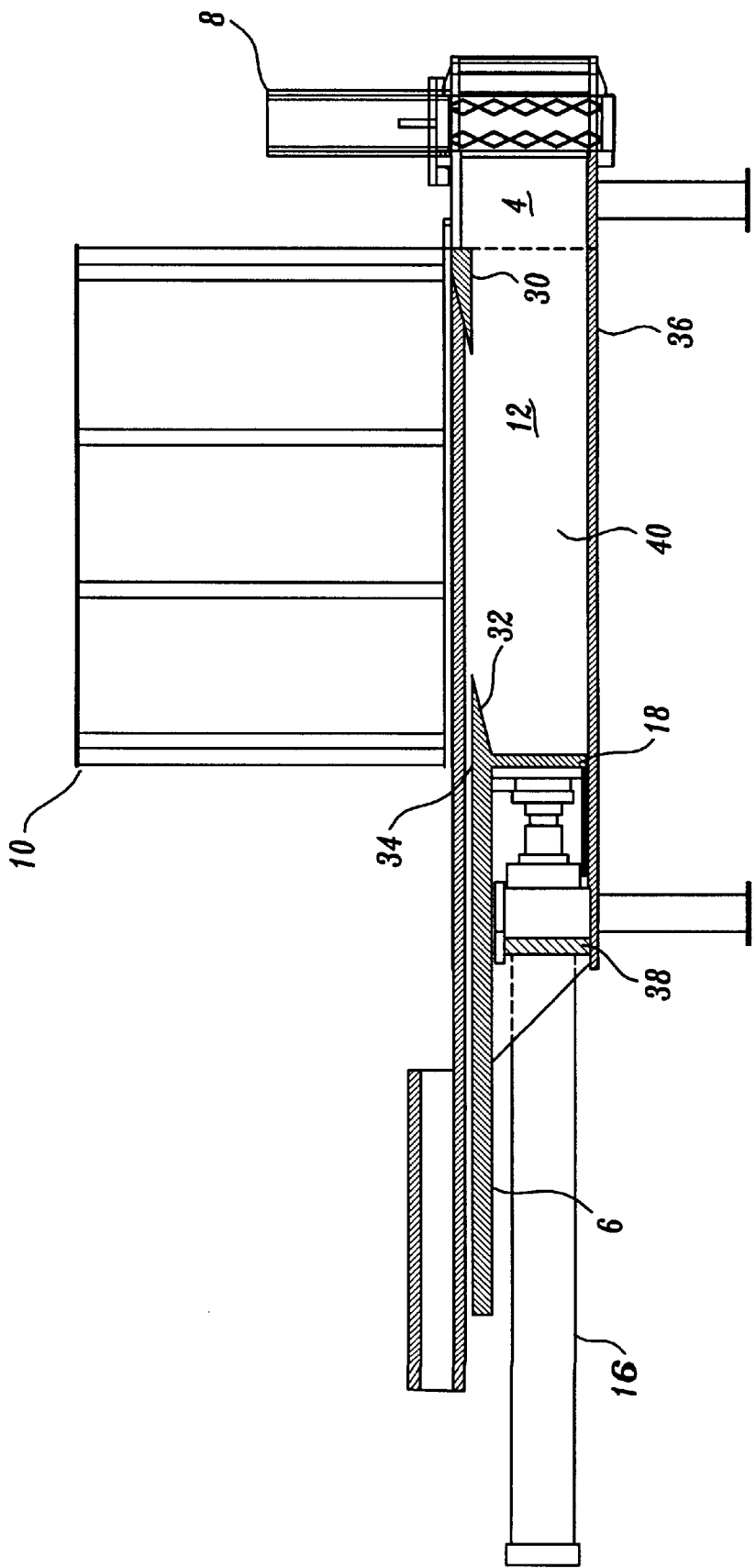
FIG. 2 is a side plan view of the apparatus of FIG. 1.
Figure 3:
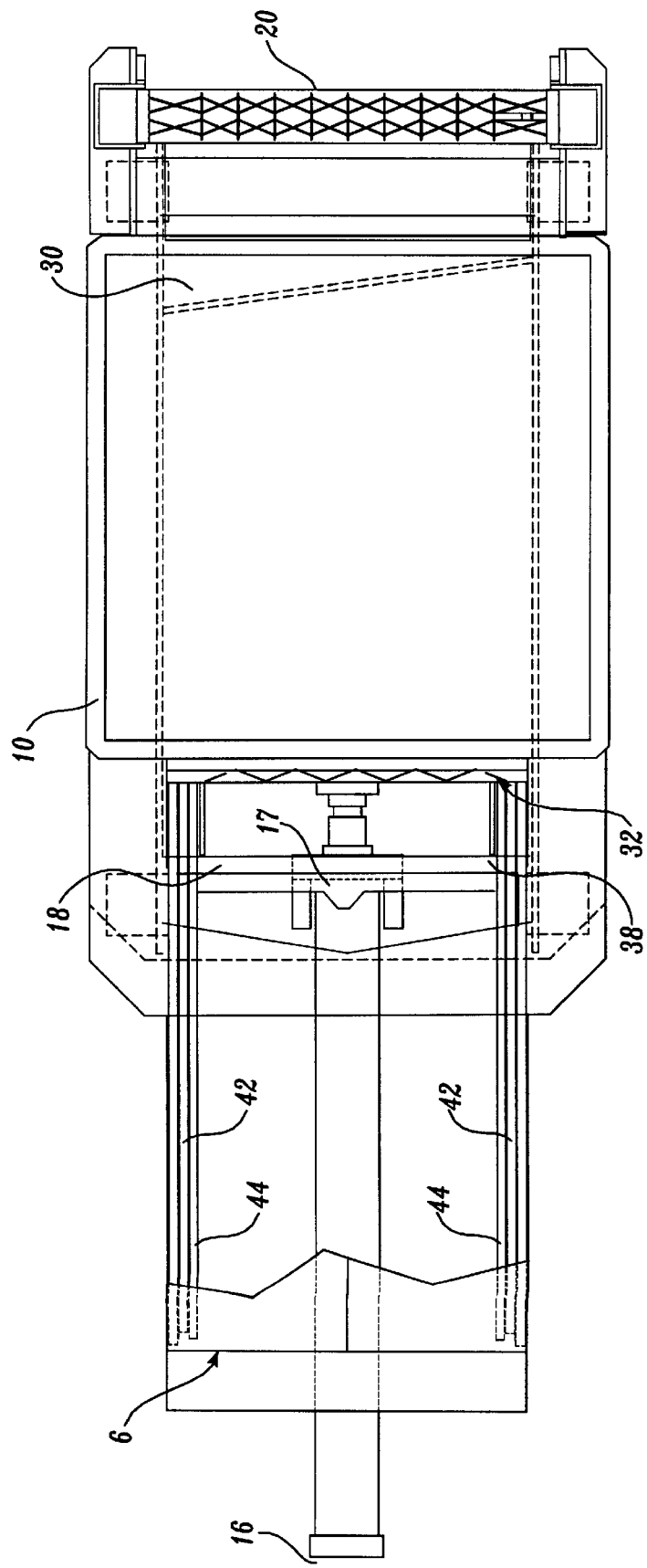
FIG. 3 is a top plan view of the apparatus of FIG. 1.

Referring to FIGS. 2 and 3, housing 14 further includes a rear wall 38 to which a piston 16 is secured using one or more mounting plates 17 fastened to the rear wall 38 and creating a passage therethrough. The rear wall 38 is securely attached to the bottom plate 36 and two side walls 40, but not to the top panel 34. In fact, the height dimension rear wall 38 is such that a gap exists between the top of rear wall 38 and the bottom of top panel 34. The gap and its purpose will be more fully discussed below. The housing of piston 16 passes through the passage in the rear wall 18 created by the mounting plates, and the shaft of piston 16 is attached to an advancement plate 18, which defines the rear of the holding chamber 12. The advancement plate 18 is positioned vertically in the housing 14 at or slightly behind the rear of the opening between intake hopper 10 and the top panel 34. The piston 16 is connected to and/or powered by any commonly-available power source (not shown) suitable for activating the piston 16 and generating sufficient force to move the advancement plate 18 through the length of holding chamber 12 as well moving as any material in the holding chamber 12 through the cutting grid 20. Those skilled in the art will recognize that any other means of moving the advancement plate 18, such as a hydraulic ram or the like, a screw drive, or a chain drive, may be used in place of the piston 16 without departing from the spirit of the invention.

Figure 4:
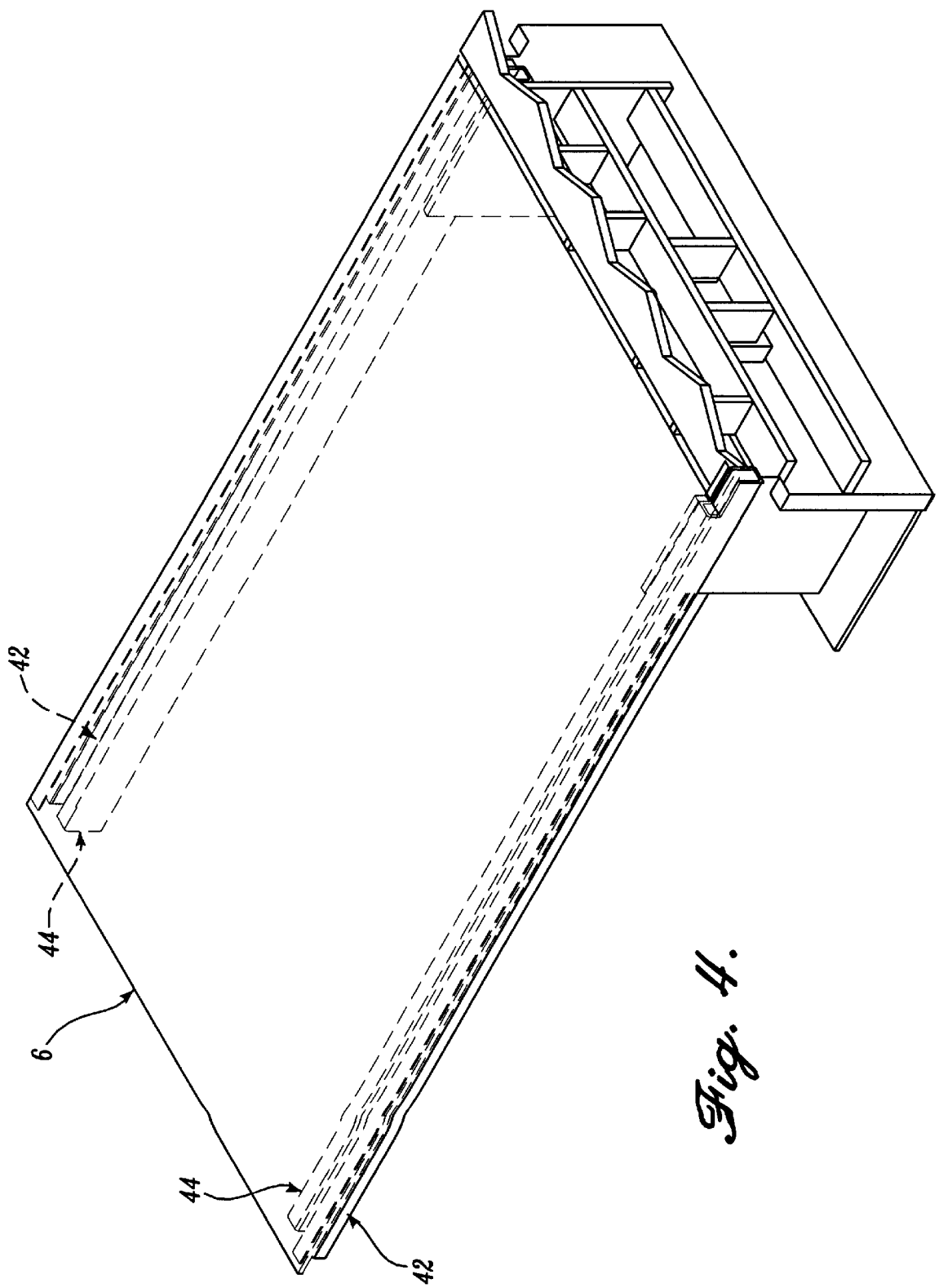
FIG. 4 is a perspective view of a sliding panel or false bottom according to the present invention.

Attached to the advancement plate 18 is a sliding panel 6 or false bottom, which is a rectangular plate extending rearwards from the advancement plate 18. Referring to FIGS. 3 and 4, the sliding panel 6, or false bottom, is essentially a rectangular panel for separating the intake hopper 10 from the holding chamber 12, and closing the opening therebetween as the advancement plate 18 is moved forward from the read of the holding chamber 12. The sliding panel 6 has the same length and width dimensions as the opening between the intake hopper 10 and the apparatus housing 14, but is preferably slightly larger to ensure that no material falls behind the advancement plate 18 and into the apparatus housing when the advancement plate 18 moves past the rear edge of the opening between the intake hopper 10 and the apparatus housing 14. Attached to the underside of the sliding panel 6 are two guide rails 44, one to either side of the sliding panel 6 in parallel with each other and with the side walls 40. The guide rails 44 are supported by, and slide on, support brackets 42 which support the guide rails 44 such that sliding panel 6 remains substantially parallel to the top 34 and bottom 36 panels of housing 14.

The support brackets may be attached to either the top panel 34 or to the side walls 40, and are configured accordingly to provide a horizontal supporting shelf for the guide rails 44. Referring to FIG. 2, in order to accommodate the sliding panel 6, the gap between the top of rear wall 38 and the bottom surface of top panel 34 is of a sufficient height to allow the sliding panel 6 to slide freely.

Returning to FIGS. 3 and 4, also attached to, and running the length of, the advancement plate 18 is an active rear separating blade 32, with the cutting edge facing forward toward the cutting grid 20. Rear separating blade 32 is configured as a flat blade and mounted essentially in parallel with the top 34 and bottom 36 panels of the housing 14. The rear separating blade 32 is "active" in the sense that to cut material, it must be thrust through the material as opposed cutting by action of material being pushed against the blade.

Within the apparatus housing, at the opening between the intake hopper 10 and the apparatus housing 14, is mounted a passive forward separating blade 30, with the cutting edge facing rearward toward the advancement plate 18. Forward separating blade 30 is configured and mounted such that the sharpened edge is that of a tapered blade forming an acute angle with the advancement plate 18. Additionally, forward separating blade 30 is mounted with the sharpened edge pointing slightly downward from the top surface of apparatus housing 14. Forward separating blade 30 is "passive" in that it is a stationary blade that requires the action of material being thrust against it for cutting action.

Hay, other agricultural products, or materials to be recycled is cut in the preferred embodiment of the invention in the following manner. Material to be cut is loaded into the intake hopper 10, either as loose material or packaged as bales, which opens to a holding chamber 12.

When the material is loaded into the intake hopper 10, it forms a column of material from the bottom of the holding chamber 12 up to a level near or above the top of the intake hopper 10. Alternatively, when the invention is used in an automated process, with a constant flow of material being deposited in the intake hopper 10, the amount of material within the holding chamber 12 and intake hopper 10 may fluctuate about a relatively constant level as the apparatus processes the material.

In the apparatus housing 14, a piston 16, hydraulic ram or the like, impels the advancement plate 18 forward, moving the material toward the cutting grid 20. Since the material in the apparatus presents a continuous column from the bottom of the holding chamber 12 to a point above the top of the holding chamber 12, the column must be separated, and material in the intake hopper 10 must be prevented from falling behind the advancement plate 18.

Material is separated by forward and rear separating blades, 30 and 32, respectively, which cooperate with the advancement plate 18 to cut the interstitial material that extends between intake hopper 10 and holding chamber 12. Rear separating blade 32 is actively thrust through the interstitial material from the rear as the rear separating blade 32 advances forward along with advancement plate 18. Since the advancement plate 18 tends to move the entire column of material at once, interstitial material at the front of the holding chamber 12 is concurrently being pressed against and passively cut by forward separating blade 30 at the forward edge of the opening between intake hopper 10 and holding chamber 12.

More specifically, as the advancement plate 18 advances forward in the holding chamber 12 against the column of material, the bottom of the column of material translates forward along the bottom of the holding chamber 12, while the top of the column is constrained from moving by the edge of the opening between the intake hopper 10 and the holding chamber 12. Thus, the column is subjected to a shear force at that interface. The presence of forward separating blade 30 results in the shear force being applied to the column at the sharp edge of forward separating blade 30, thereby separating the bottom of the column from the top. The downward angle of the forward separating blade 30 further enhances the upward and downward separation of the column. Furthermore, since the bottom of the column is being pushed forward by advancement plate 18 from the rear, while the top of the column is constrained from moving, an additional shear force is exerted against the column from the rear. Rear separating blade 32 attached to advancement plate 18 applies the shear force along the sharpened edge of the rear separating blade 32, thereby separating the column from the rear. Thus, the column of material is separated from both front and back as the material in the holding chamber 12 is moved toward the cutting grid 20.

As the advancement plate 18 advances toward the cutting grid 20 at the front of holding chamber 12, the sliding panel 6 is drawn forward, sliding along the support brackets 42, to close the opening between the intake hopper 10 and the holding chamber 12. When material passes the holding chamber 12, it reaches the expansion area 4 where it is permitted to expand prior to cutting. Since the material is compressed as it is separated between the holding chamber 12 and the intake hopper 10, the material is under a great deal of pressure as it exits the holding chamber 12. Material under pressure is difficult to cut, because of an increased friction between the material and the walls. Additionally, the material must be further compressed, creating an additional frictional component, as it passes the cutting frame 20 from the displacement created by the slicing blades. Thus, expansion area 4 is provided to allow material to expand, relieving pressure, prior to entering the cutting grid, and thereby reduces the force required to cut the material as well as the wear of the slicing blades.

Upon reaching cutting grid 20, the material is pressed against, and cut into shorter lengths by, slicing blades, and out of the apparatus. When the advancement plate 18 reaches the cutting grid 20, all the material in the holding chamber 12 leaves the apparatus and the false bottom 6 completely separates the intake hopper 10 from the holding chamber 12. Preheating of the slicing blades has been found to result in greater ease in cutting the material. No internal heating element is required after the initial preheating as the friction of material rubbing past the blades is generally sufficient to maintain an elevated temperature.

After all the material is pressed out of the apparatus through cutting grid 20, the piston 6 retracts, drawing the advancement plate 18 back to the rear of the holding chamber 12. As the piston 6 retracts, the sliding panel 6 also recedes back into housing 14 thereby opening the holding chamber 12 to intake hopper 10. As the holding chamber 12 opens, more material is allowed to fall in, and, once the advancement plate 18 reaches its rearmost position, the process begins again with a new load of material.

As can be seen from the described embodiment, hay may easily be cut into smaller pieces which are easier for cattle and other animals to consume using the apparatus of the present invention. Those skilled in the art will readily appreciate that the inventive apparatus is also useful for processing straw and other agricultural materials, especially fibrous ones, as well as in the recycling of paper and other materials.

As stated above, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for cutting hay, straw, or other agricultural material comprising:

a housing having a top, a bottom, and two side walls joined to form a rectangular tube;

a cutting grid removably attached to the front end of the housing;

an intake hopper attached to the top of the housing for receiving material to be cut;

a holding chamber for holding the material to be cut, the holding chamber being located within the housing, directly beneath the intake hopper, the top of the housing having an opening for providing a passage between the intake hopper and the holding chamber, and for allowing material received in the intake hopper to fall into the holding chamber;

an advancement plate forming a rear wall of the holding chamber, the front surface of the advancement plate for moving material through the length of the holding chamber toward and through the cutting grid;

advancing means for advancing the advancement plate through the length of the holding chamber; and a sliding panel for separating and closing off the passage between the intake hopper and the holding chamber as the advancement plate is moved through the holding chamber, the front of the sliding panel being attached substantially perpendicular to the advancement plate.

2. The apparatus of claim 1, wherein the advancing means comprises a piston having a shaft and a housing located at a longitudinal center of the apparatus housing, the piston shaft being slidably housed in piston housing, the front end of the piston shaft being attached to the advancement plate for moving the advancement plate through the holding chamber.

3. The apparatus of claim 1, further comprising one or more vertically-mounted channel guides for guiding and securing the cutting grid to the apparatus housing, the channel guides being located at the front and sides of the apparatus housing; wherein the cutting grid is attached to and removed from the apparatus by sliding the cutting grid down and up, respectively, along the channel guides.

4. An apparatus for cutting hay, straw, or other agricultural material comprising:

a housing having a top, a bottom, and two side walls joined to form a rectangular tube;

a cutting grid removably attached to the front end of the housing;

an intake hopper attached to the top of the housing for receiving material to be cut;

a holding chamber for holding the material to be cut, the holding chamber being located within the housing, directly beneath the intake hopper, the top of the housing having an opening for providing a passage between the intake hopper and the holding chamber, and for allowing material received in the intake hopper to fall into the holding chamber;

an advancement plate forming rear wall of the holding chamber, the front surface of the advancement plate for moving material through the length of the holding chamber toward and through the cutting grid;

advancing means for advancing the advancement plate through the length of the holding chamber;

a sliding panel for separating and closing off the passage between the intake hopper and the holding chamber as the advancement plate is moved through the holding chamber, the front of the sliding panel being attached substantially perpendicular to the advancement plate;

a forward separating blade fixedly attached to the apparatus housing for passively separating the material in the holding chamber from the material in the intake hopper by cutting material between the holding chamber and intake hopper as material is pressed against it by action of the advancement plate and piston, the forward separating blade being attached to the apparatus housing at the front end of the opening, and having a cutting edge facing toward the rear of the apparatus; and a rear separating blade attached to the advancement plate, the rear separating blade for actively separating the material in the holding chamber from the material in the intake hopper by cutting material between the holding chamber and intake hopper as the rear separating blade is thrust against and through the material by action of the advancement plate and piston, the rear separating blade having a cutting edge facing toward the front of the apparatus.

5. The apparatus of claim 4, wherein the forward separating blade is a slanted blade having a cutting edge oriented at an acute angle with respect to the front edge of the opening, and wherein the forward separating blade is mounted such that the cutting edge faces slightly downward.

6. A cutting grid for use in an apparatus for cutting hay, straw, or other agricultural material comprising:

at least one horizontal blade, each having at least one cutting edge running the length of the horizontal blade; and at least one vertical blade, each having at least one cutting edge running the length of the vertical blade; wherein the cutting edges of the horizontal and vertical blades comprise edge segments connected in zigzag patterns to form peaks and valleys in the cutting edges; and wherein the horizontal blades and the vertical blades are connected together where they intersect with each other.

7. The cutting grid of claim 6, wherein the horizontal blades and the vertical blades intersect with each other such that peaks of the horizontal blades intersect with corresponding peaks of the vertical blades and valleys of the horizontal blades intersect with corresponding valleys of the vertical blades.

8. The cutting grid of claim 6, wherein the horizontal blades and the vertical blades are all double-edged blades, with one side of each blade having a pattern of peaks and valleys that is the opposite of the pattern on the other side.

* * * * *